United States Patent [19]
Förster et al.

[11] 3,802,994
[45] Apr. 9, 1974

[54] DEVICE FOR COOLING THE STRUCTURAL MATERIALS OF A REACTOR CORE AND FOR CARRYING OFF THE POST-DISINTEGRATION HEAT

[75] Inventors: Siegfried Förster, Alsdorf; Karl-Uwe Schneider, Betzdorf; Karl-Wilfried Haarmann, Julich, all of Germany

[73] Assignee: Kernforschungsanlage Julich Gesellschaft mit beschrankter Haftung, Julich, Germany

[22] Filed: Dec. 6, 1972

[21] Appl. No.: 312,564

[30] Foreign Application Priority Data
Dec. 7, 1971   Germany..................2/60507

[52] U.S. Cl............. 176/59, 176/58, 176/60, 176/61, 176/65
[51] Int. Cl................ G21c 15/10, G21c 15/24
[58] Field of Search............ 176/58, 59, 60, 61, 65

[56] References Cited
UNITED STATES PATENTS

| 3,305,451 | 2/1967  | Taylor et al. | 176/60 |
| 3,682,772 | 8/1972  | Bredtschneider | 176/65 |
| 3,607,634 | 9/1971  | Gerard et al. | 176/61 |
| 3,357,892 | 12/1967 | Schmidt | 176/65 |
| 3,184,391 | 5/1965  | Hackney | 176/61 X |
| 3,509,023 | 4/1970  | Williams | 176/59 X |
| 3,713,972 | 1/1973  | Coast et al. | 176/60 |
| 3,159,549 | 12/1964 | Moore et al. | 176/60 X |

*Primary Examiner*—Carl D. Quarforth
*Assistant Examiner*—Roger S. Gaither
*Attorney, Agent, or Firm*—Walter Becker

[57] ABSTRACT

A device for cooling the structural materials of the core of a gas cooled nuclear reactor and for carrying off the post-disintegration heat occurring after shut down of the core reactor. The core is surrounded by a reflector and is within a container of prestressed concrete or the like; the core has an inlet and outlet for the cooling gas. The reflector and container are radially spaced from one another so as to form an annular chamber, which contains cooling gas or solid material suitable for heat transfer. A thermal shield protects that wall of the container which faces the core from heat effects. A radiator is also provided in the annular chamber. Circulation blowers are arranged in chamber means above the core within the container and are in communication with the radiator, the inlet for the cooling gas, and the annular chamber. The chamber means and the annular chamber are selectively opened or closed by valves.

5 Claims, 2 Drawing Figures

DEVICE FOR COOLING THE STRUCTURAL MATERIALS OF A REACTOR CORE AND FOR CARRYING OFF THE POST-DISINTEGRATION HEAT

The present invention relates to a device for cooling the structural materials of the core of a gas cooled nuclear reactor, the core being surrounded by a reflector and being located within a container of prestressed concrete or the like and arranged in spaced relationship to the reflector, said core having an inlet and an outlet for the cooling gas. The present invention also includes means for carrying off the post-disintegration heat occurring after the shut down of the nuclear reactor.

With a gas cooled thermal reactor, especially with high temperature reactors, it is necessary to carry off not only the heat generated during the output operation of the structural materials, such as the reflector, other graphite components, the thermal shield, and the like, but also the post-disintegration heat which is not suppressable and which fades away with time after the shut down of the reactor.

Up to now the above was accomplished by having the gas which is used to cool the reactor, before entering into the reactor, pass by a structural component to be cooled in such a way that the heat is imparted to the gas. However, this creates difficulties, especially if the reactor is arranged in a container of prestressed concrete the walls of which must be kept at a temperature below 60° C, and if the temperature of the cooling gas entering the reactor is at or above 400° C. The carrying off of the post-disintegration heat leads to difficulties if technologically inadmissibly high temperatures are reached in the structural components under consideration of the nuclear reactor. This is due to the high heat capacity of the structural materials of the reactor structural components after shutting down of the reactor, although only after a lengthy lapse of time following the shut down. Even after expiration of this length of time, these temperatures can be considerable. It is therefore necessary, in order to carry off the post-disintegration heat, to take additional special steps when the subsequent circulation system which is common to the reactor is no longer functioning, or when within the reactor the forced circulation of the circulating gas necessary for the cooling is no longer assured. In order to also carry off this heat, circulation blowers are used by means of which the cooling gas is conveyed through the reactor and the gas which is used for flowing through the reactor is delivered to places where the gas is again cooled. These steps are sufficient with so called two-circuit arrangements, with which the gas used to cool the reactor is not also the gas flowing through the subsequent circuit. For this purpose the steam generators normally provided in the circulation system are the cooling off places. However, with so called single-circuit arrangements with which the cooling gas is also the gas flowing through the subsequent circuit, and with which the gas cooling places are the pre- or intermediate coolers present in the gas circuit, disturbances in the primary circuit are very detrimental. Either the cooling gas no longer arrives in a cooler provided in a circuit for cooling off the gas, or the cooling gas can no longer be forcibly circulated. Therefore, it is necessary to provide special additional coolers and/or other devices in order for the gas to circulate. However, this involves additional expenditures.

It is an object of the present invention to provide a device for cooling the structural components of a gas cooled reactor core and for carrying off the post-disintegration heat occurring after the shut down of a nuclear reactor, which device will assure the cooling of the structural elements and also the carrying off of the post-disintegration heat regardless of the type of disturbance arising in the circuit of the reactor cooling gas.

This object and other objects and advantages of the present invention will appear more clearly from the following specification in connection with the accompanying drawings in which.

The device according to the present invention is characterized primarily in that, within the annular chamber formed by the reflector and the reactor container, inside a thermal shield which protects from heat effects that wall of the reactor container which faces the reactor core, there is provided a radiator and an annular passage containing cooling gas or a solid material suitable for heat transfer. A plurality of circulation blowers is arranged above the reactor and within the reactor container. The suction side of the circulation blowers is connected to the radiator through gas conduits or distributors. The pressure side of the circulation blowers is connected to the inlet for the cooling gas flowing through the reactor core as well as to the chamber closable by means of valves. The upper gas distributor and the gas distributor for the gas flowing through the radiator are connected by openings which are closable by means of valves. Furthermore, valves for closing off the annular passage formed between the reflector and the radiator are provided in case the annular passage contains cooling gas. Finally, a gas distributor designed as a thermal gas deflecting lock is provided between the chamber surrounded by the radiator and the outlet for the cooling gas flowing through the reactor.

The transfer of the heat to the cooler is effected by heat conduction of a solid material is arranged in the annular passage, or is effected by convection if the annular passage is filled with the cooling gas. If the heat transfer is effected by connection, the rib or fin shaped cooler is expediently closed on that side facing the annular passage, yet is open above and below. The cooling is effected in such a way that the gas in the radiator forms one gas circulation or circuit with the gas flowing through the reactor. Instead, of course, a closed gas circuit can also be formed by the chamber surrounded by the radiator and by the annular passage. If the annular passage is filled with a heat conducting solid material, a stream of cooling gas largely adapted to the respective conditions in the reactor can be forcibly induced for the additional cooling by means of circulating pumps and shut off devices. An adjustment or adaptation in conformity with the respective requirements is, of course, likewise possible, when the annular passage is filled with the cooling gas.

Figure 1:
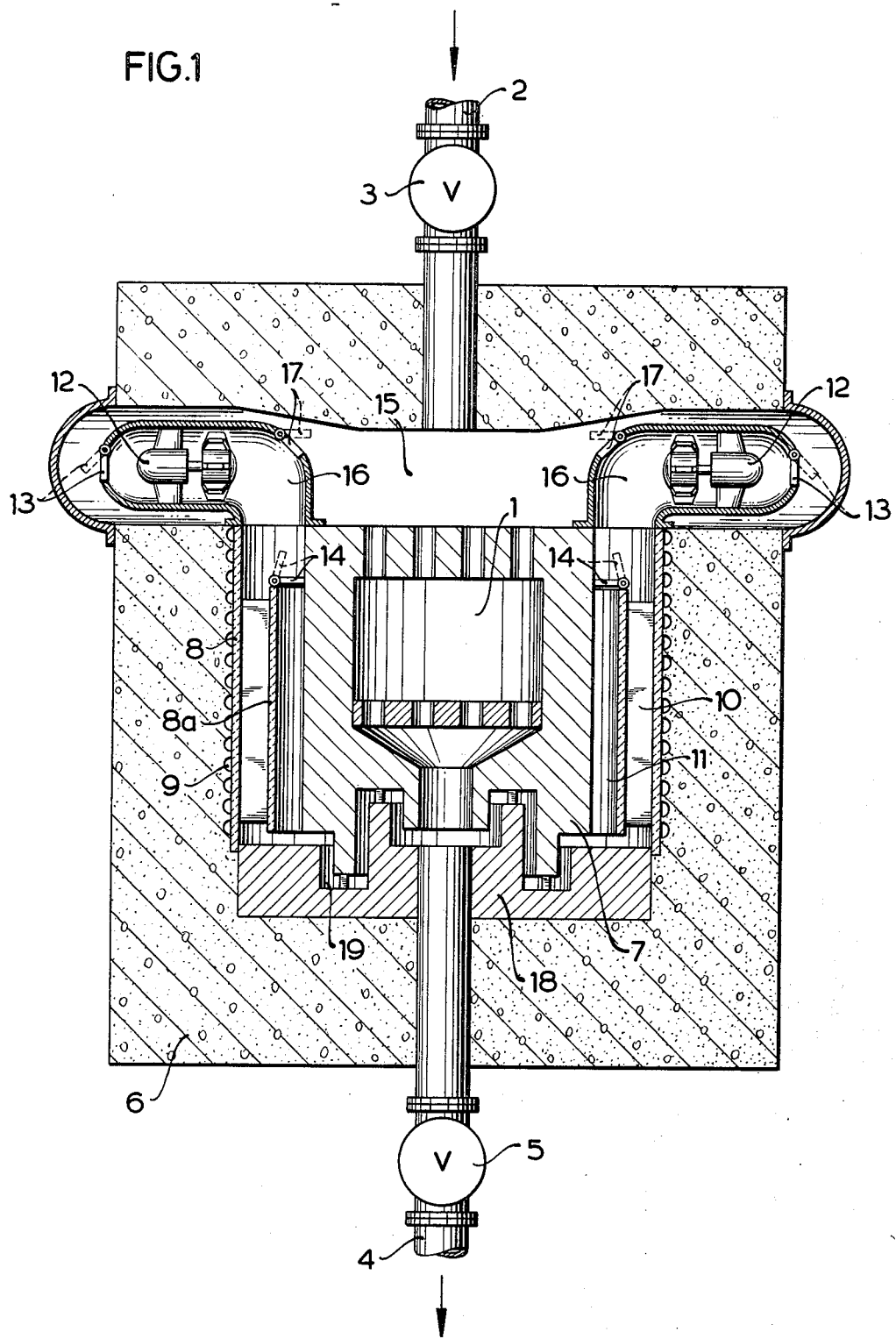
FIG. 1 shows the core of a gas cooled reactor with the cooling gas contained in an annular passage or chamber according to the invention.

Referring now to the drawings in detail, and in particular to FIG. 1, the cooling gas flows downwardly through the reactor core 1 from above through the shut off device 3 provided in the inlet 2 for the cooling gas, and leaves the reactor core 1 again through the shut off device 5 provided in the gas outlet 4. The reactor core 1 is arranged in a container 6 made of pre-stressed concrete, and is surrounded on all sides by the reflector 7. An annular passage or chamber 11 is formed between the vertical outer wall of the reflector 7 and that wall of the reactor container which is opposite this outer reflector wall 7. To protect the concrete of the reactor container 6, a thermal shield 8 is arranged on that wall which faces the reflector 7. Cooling means 9 are connected with the thermal shield 8 and the wall of the reactor containing 6. In this way, a portion of the heat carried by the radiator 10 which is connected with the thermal shield 8 is carried off. That side of the radiator 10 which faces the reflector 7 is covered with a thermal shield 8a or the like. In this connection, the thermal shield 8, the radiator 10, and the thermal shield 8a provided opposite the annular passage 11 for covering the radiator 10 are so constructed that, in the event that the free annular passage 11 between the reflector 7 and the reactor container 6 is filled with cooling gas, the gas can flow undisturbed through the radiator 10. With this specific embodiment of the device according to the invention, the upper outlet of the radiator 10 is connected to the suction side of a plurality of gas circulating pumps or blowers 12 (two only being shown in the drawings) which are arranged above the reactor, preferably at the periphery of the reactor. Valves or hinged covers 13 are arranged behind the circulating pump 12 when looking in the direction of flow. The gas supplied by the circulating pumps 12 can be fed to the upper side of the nuclear reactor through the opening controlled by these hinged covers 13. The annular passage 11 formed between the reflector 7 and the reactor container 6 is closable toward the top by means of valves 14. In addition, openings, closable by means of valves or flaps 17 and arranged at the suction side of the circulating pumps 12 in the gas distributor or conveying means 16 which leads to the annular passage 11, are provided between the upper gas distributor or conveying means 15, intended for the cooling gas which flows through the reactor core 1, and the gas distributor or conveying means 16 provided for the gas which flows through the reactor core 1.

During the power operation of the reactor core 1, the valves 13 and 17 are closed while the valves 14 are open. The circulating blowers 12 are turned off. The gas warmed up in the annular passage 11 rises and is again cooled by flowing through the radiator 10. A constant natural convection stream or current is thus formed. Since, moreover, a thermal gas deflecting lock 19, connected with the cooling gas which flows through the annular passage 11 and the outlet 4 for the reactor core 1, is provided in the core support 18, a mass exchange between the gas circulating in the annular passage 11 and in the radiator 10 and the cooling gas flowing through the reactor core 1 is avoided. If it is desired to carry off the post-disintegration heat after shutdown of the reactor, the valves 14 and 17 are closed and the valves 13 are opened. The circulating blowers 12 are in operation. In addition, the shut-off devices 3 or 5 respectively located in the gas inlet 2 or in the gas outlet 4 are closed. In this case, a gas stream is forcibly introduced through the reactor core 1 and the radiator 10 by means of the circulating blowers 12, in which instance the gas from the outlet side of the reactor flows through the gas deflecting lock 19 and the radiator 10.

Should the post-disintegration heat result when the circulating pumps 12 are shut off or are out of action, the valves 13 and 14 are closed and the valves 17 are opened. In addition, in this circumstance of operation, the inlet 2 and outlet 4 for the cooling gas which flows through the reactor core 1 are closed. In this instance, a gas stream results in the reactor core and is guided first upwardly and in the natural circulation through the radiator 10. In so doing, the heated gas is cooled in the radiator 10 and arrives from there into the reactor again through the gas deflecting lock 19.

Figure 2:
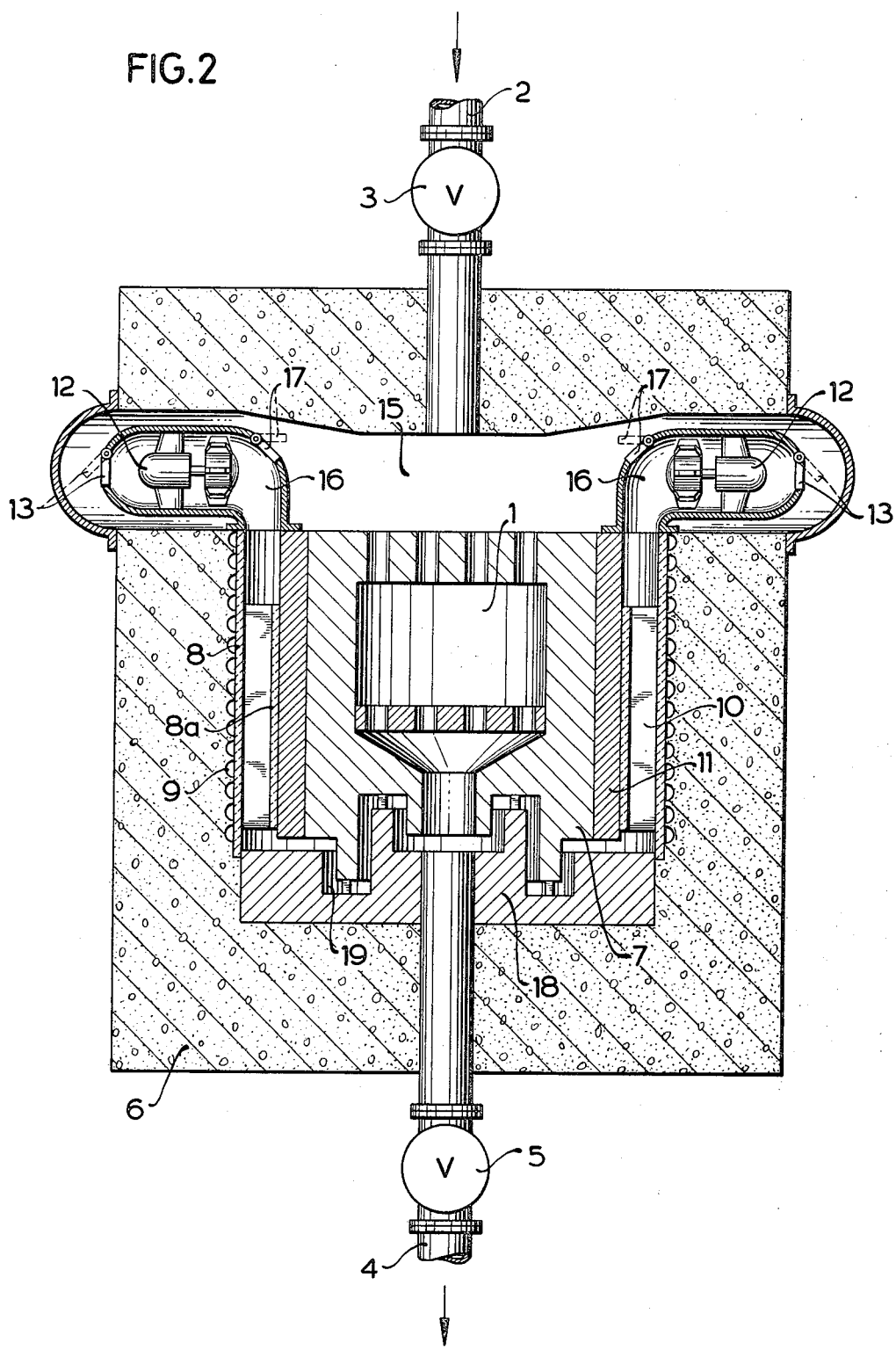
FIG. 2 shows the core of a gas cooled reactor with solid material in the annular passage or chamber according to the invention.

With the specific embodiment illustrated in FIG. 2, the annular passage 11 is filled with a solid material. The layer formed of solid material is circularly arranged around the reflector 7 and is connected with the outer periphery of the radiator 10. Likewise in the operation of the core reactor 1 with this specific embodiment, the valves 13 and 17 are closed and the circulating blowers 12 are shut off. The heat is carried off from the reflector 7 by means of the solid material layer which fills the annular passage 11 and is passed directly through the radiator 10 to the cooler 9 provided in the walls of the reactor container 6. In this case also, the gas deflecting lock 19 prevents a gas exchange between the gas in the radiator 10 and the cooling gas which flows through the outlet 4.

To carry off the post-disintegration heat after the shutdown of the reactor, the valves 17 are closed and the valves 13 are open. In addition, either the shut off device 3 or 5 respectively located in the gas inlet 2 or in the gas outlet 4 on the reactor container 6 are closed. In this instance, cooled gas is conveyed by the circulating blowers 12 to the upper gas distributor 15 for the reactor core 1 and hot gas is drawn off from the outlet 4 through which passes gas flowing through the reactor core 1; the outlet 4 is connected with the annular passage 11 through the gas deflecting lock 19. The gas circulated in this manner is cooled in the radiator 10.

To carry off the post disintegration heat when the gas circulating pumps 12 are turned off or are out of action, the valves 13 are closed and the valves 17 are open. As a result thereof, a gas stream is formed in the reactor core 1, which gas is first directed upwardly and as it progresses is deflected so that it flows through the radiator 10, consequently being cooled. In this connection, the gas is again supplied to the reactor core 1 through the gas deflecting locks 19.

It is, of course, to be understood that the present invention is by no means limited to the specific showing of the drawings, but also comprises any modifications within the scope of the appended claims.

What we claim is:

1. A device for cooling the structural materials of the core of a gas cooled nuclear reactor as well as for carrying off the post-disintegration heat occurring after shut down of said core reactor, which comprises: reflector means surrounding said core; a reactor container for confining said core, said container being arranged in radially spaced relationship to said reflector means so as to form an annular chamber therebetween; inlet means associated with said core for the introduction of cooling gas; outlet means associated with said core for the discharge of cooling gas, thermal shield means arranged on that wall of said reactor container which faces said core for protecting said wall of said reactor container from heat effects; radiator means located in said annular chamber between said reflector means and said reactor container; chamber means arranged above said core, and within said container, and in communication with said annular chamber, said radiator means, and said inlet means; valve means for selectively opening and closing said chamber means; and circulation blower means arranged in said chamber means for circulating cooling gas through said chamber means.

2. A device according to claim 1, which includes additional valve means for selectively opening and closing said annular chamber.

3. A device according to claim 1, in which said reactor container is made of prestressed concrete.

4. A device according to claim 1, in which said annular chamber is partially filled with gas for cooling said core.

5. A device according to claim 1, in which said annular chamber is partially filled with solid material suitable for heat transfer.

* * * * *